(12) United States Patent
Snyder

(10) Patent No.: US 12,556,546 B2
(45) Date of Patent: Feb. 17, 2026

(54) METHOD FOR IDENTIFYING TRUSTED USERS

(71) Applicant: Jonathan Snyder, San Antonio, TX (US)

(72) Inventor: Jonathan Snyder, San Antonio, TX (US)

( * ) Notice: Subject to any disclaimer, the term of this patent is extended or adjusted under 35 U.S.C. 154(b) by 18 days.

(21) Appl. No.: 18/761,151

(22) Filed: Jul. 1, 2024

(65) Prior Publication Data

US 2025/0023882 A1 Jan. 16, 2025

(51) Int. Cl.
*H04L 9/40* (2022.01)

(52) U.S. Cl.
CPC .................. *H04L 63/126* (2013.01)

(58) Field of Classification Search
CPC ... H04L 63/0861; H04L 63/102; H04L 63/12; H04L 63/123; H04L 63/126; H04L 9/3231; G06F 21/316; G06F 21/32; G06F 2221/2111; G06F 2221/2133
See application file for complete search history.

(56) References Cited

U.S. PATENT DOCUMENTS

| | | | | |
|---|---|---|---|---|
| 10,868,672 B1 * | 12/2020 | Farrugia | ............... | H04L 9/0861 |
| 2011/0138176 A1 * | 6/2011 | Mansour | ............. | H04L 63/0861 |
| | | | | 713/168 |
| 2012/0068820 A1 * | 3/2012 | Mollicone | ........... | H04L 63/0861 |
| | | | | 340/5.82 |
| 2013/0276145 A1 * | 10/2013 | Brown | ................... | H04L 63/10 |
| | | | | 726/29 |
| 2015/0326570 A1 * | 11/2015 | Publicover | ........... | H04W 12/065 |
| | | | | 382/117 |
| 2016/0112416 A1 * | 4/2016 | Brown | ................ | G06F 16/9535 |
| | | | | 726/5 |
| 2016/0283699 A1 * | 9/2016 | Levin | ..................... | H04L 63/102 |
| 2016/0353282 A1 * | 12/2016 | Richards | ............. | H04W 12/068 |
| 2019/0133474 A1 * | 5/2019 | Longinotti-Buitoni | | ...................... |
| | | | | G06F 3/017 |
| 2019/0173873 A1 * | 6/2019 | Brown | ................ | H04L 63/0823 |
| 2019/0190716 A1 * | 6/2019 | Thackston | ............ | H04L 9/3231 |
| 2021/0226987 A1 * | 7/2021 | Summers | ............ | H04L 63/1408 |
| 2024/0179008 A1 * | 5/2024 | Hu | ........................ | H04L 9/3239 |

OTHER PUBLICATIONS

Yang, Yinghui "Web user behavioral profiling for user identification" [Online], Jun. 2010 [Retrieved on: Sep. 17, 2025], Decision Support Systems vol. 49iss.3, Retrieved from: < https://www.sciencedirect.com/science/article/pii/S0167923610000497 > (Year: 2010).*

* cited by examiner

*Primary Examiner* — Eric W Shepperd

(57) ABSTRACT

The following invention is directed towards user identity verification and utilizes enhanced abilities to detect both a user's identity and confirming that the user is in fact a person and not a bot. The device utilizes Universal Unique Identifiers (UUIDs) indicating the device's interaction with the various environmental and electronic devices located around it. These interactions can indicate if a user has human characteristics. As a user interacts with their device and that device interacts with the surrounding world, a UUID is created and is then stored upon a user's device as well as created in an online database. When a user wishes to access an online service, for example, social media, the user will make a request to that service. The online service may then ask for a list of UUIDs from the user device to verify that they are who they say they are. If these UUIDs satisfy the request, the user identity is confirmed.

14 Claims, 9 Drawing Sheets

METHOD FOR IDENTIFYING TRUSTED USERS

CROSS-REFERENCE TO RELATED APPLICATIONS

None.

BACKGROUND

Field of Art

This invention is related to electronic security. More specifically this invention relates to identity verification of trusted users on social media platforms and all electronic devices to include cell phones, text messages, voice calling, and other forms of communication.

Discussion of the State of the Art

Social media platforms, financial services, websites, and other related resources have made access to information over an electronic network essential for users. In information technology services, malicious individuals will attempt to utilize robots, also called bots, to abuse systems that have been set up for human interaction. While humans can follow a series of prompts to gain access to an online service, bots can be programmed to do the same. These bots are able to execute steps faster than a human could normally perform them and multiple bots can run concurrently on individual devices. This can cause issues for both the companies providing these services by overtaxing their system in a Distributed Denial-of-Service, DDoS, Attack; and additionally, this makes it so human users are unable to use these services because they are compromised by bots.

In an attempt to verify that a user is human, companies have utilized programs to provide a way to distinguish between human and machine inputs. Completely Automated Public Turing test to tell Computers and Humans Apart (CAPTCHA) programs are an example of such a program. These captcha programs present questions to users that involve, for example, identifying stretched letters or numbers or clicking in a specific area, that are meant to be solvable by a human, but impossible for a bot. Unfortunately, as bots have become more advanced, they have been able to solve these queries. Then these bots can rapidly solve these checks and destroy the benefit of the check.

When CAPTCHA or similar challenges fail to detect bot inputs through their queries, sometimes companies will attempt to request a user input, but only after a set amount of time expires. This method attempts to limit the number of times a bot can access a service by increasing the time it takes to sign in to a service. While the bot's ability to generate inputs is limited by the processing power of the device it is running on, a human is limited by the speed of their input method, usually typing. A bot's inputs are typically much faster than that of a human user. This solution limits a bot's ability to flood a service with excessive requests, but does create an inconvenient delay for a human user.

In an effort to prevent bots from accessing their service, companies have been creating lists of known bots or malicious users. Artificial Intelligence, AI, has been deployed attempting to detect bots and create these blacklists of users. AI will look for patterns in behavior that are found in bots and add these users to the blacklist. These blacklists automatically refuse service to any user on these lists thus limiting the number of requests and increasing usability for human users. Bots have found a way to avoid these lists by pretending to be new users or mimicking human behavior, and therefore would not appear on any blacklist. This challenge between the AI and the bot remains a back and forth interaction as one side becomes a little better the other then works to catch up. Potentially as the AI becomes more advanced, it could potentially add non-threatening human users to the black list if it detects a false positive. In addition, companies usually maintain their own blacklist for their service, and are likely to let the bot through the first time it uses the service.

A white list, or a list of trusted users, could be created and tracked by a service, but it would need an identifier for a user so that a known trusted user would be allowed in without a challenge. By using Internet Protocol, IP, addresses to identify devices as known trustworthy users an online service can distinguish which user is which. This would provide a trusted way for individuals to access a service; however, IP addresses can be duplicated by a computer and once this is accomplished, a bot could gain access to a service. Using IP addresses as a way to verify someone's identity is unreliable due to these problems. Therefore companies may attempt to utilize other identification information types.

Unfortunately, relatively small amounts of data are currently used for verification by online services. If a user passes a CAPTCHA or they have an IP address that is not flagged as untrustworthy at a single time, they can be granted access to a service. These online services need to be able to allow new users to access their information, but only start building a history with the user during that first interaction. These single touch points are used to verify a person's identity a single time and lack much historical data about the trustworthiness of a user. This means that a bot only needs a short history of a single security check to be admitted onto a platform and therefore the risk of abuse is raised. Additionally a known user's information could be compromised on another service, and this information would not be known by the primary service.

Alternatively, a history of use may be utilized to see if a person is a bot or not. As a user interacts with a single service multiple times in positive ways, they will become a trusted user. Many bots will abuse this history to create accounts that only work on one platform at a time. While that bot is trusted on that platform, they fail to provide value to the service as they are not a human user. These bot accounts are undetectable when they only use a single service.

Companies have also restricted the use of some of their services to types of devices. They can restrict service usage to only accept access through applications on a phone or other mobile device. This can be used to limit the possibility of a powerful processor placed within a larger computing device to overload the system. However, phone emulation upon computers has made it difficult to track which users are actual mobile users and others who are simply bots imitating that of a person.

Emulation of phones may lead to difficulties in determining if an actual mobile device is present, however, bots or other bad actors can still utilize an uncompromised device and modify the peripherals that provide inputs into the device. By tampering with video, audio or other sensors on an untampered phone, these devices can appear to be legitimate, while providing false information. Companies have tried to detect if sensors have been tampered with by continuously monitoring the inputs in an effort to recognize any abnormalities. However, this is resource intensive and can still be undermined through advanced methods.

Additionally, a video or audio sensor can be imitated by much more primitive means. By simply placing a screen or speakers in front of the camera on a device, false information can be captured by the sensors. There is currently no solution to detecting if a video player has been placed in front of a camera to verify truthful information.

Another strategy of bots is to imitate trusted users within their devices. Bots can appear to be a contact within a mobile device and call a user as this trusted contact. This is accomplished through spoofing programs on electronic devices. These programs are unable to be detected by current day conventional means.

SUMMARY

The following invention overcomes these shortcomings found in the art through enhanced abilities to detect both a user's identity and confirming that the user is in fact a person and not a bot. The system utilizes SSH key pairs to identify a specific device and then allows for the utilization of Universal Unique Identifiers (UUIDs) indicating the device's interaction with the various electronic devices located around it. These interactions can indicate if a user has human characteristics. This can be beneficial for social media and other services.

As a user interacts with their device and that device interacts with the surrounding world, a UUID is created. This UUID is then stored upon a user's device as well as created in an online database. These UUIDs are unique to each interaction and identical copies are found both on the device and that of the database. When a user wishes to access an online service, for example, social media, the user will make a request to that service. The online service may then ask for a list of UUIDs from the user device to verify that they are who they say they are. The online service can then request a matching list of UUIDs from the online database. If these UUIDs match, the user identity is confirmed. However, if the UUIDs are different, the online service can safely assume that the device making a request is doing so maliciously and their request should be denied. Various UUID types will need to be created in order to provide a satisfactory level of confidence in a user's identity. These will need to differentiate human and bot actions.

In an effort to differentiate between human users and bots, biometric sensor data can be gathered to verify a human is using the device attempting to access a service. Biometric sensors can include various scanners for fingerprints, iris, voices, facial recognition or even accelerometers used to detect human-like movements, such as walking. These sensors are typically integrated with a user device, such as a mobile phone. Observation of a human movement, or biometric access to a device can generate this UUID. It would be difficult for a bot to mimic a walking motion if it is in a stationary processor.

As discussed above, human input into both hardware and software based keyboards typically is slower than that of a robot. Robots are capable of entering text almost instantaneously while a person has a limit on how fast they can accomplish the same task. By using keyboards that can detect both the speed of input and potentially, a hardware keyboard that can detect how strong a keystroke is entered into the device, bot inputs and human inputs can be identified. The use of the keyboard similar to that of a human could then create a new UUID.

By producing these UUIDs, a long list of human-like interactions can be created. These UUIDs would then be associated with a user and could then identify them as a trusted user. These trusted users could then be placed onto a white list. Utilization of white lists for electronic services can then improve security on systems. This is because the system would only allow individuals who are verified users and known quantities. By only allowing approved users on, there would be a reduction of processed requests by unknown users who potentially could be bot accounts.

Bot accounts are usually limited to a single geographical area and rarely move around. While accelerometers can be used to detect the motion of the device over short distances. User phones and other mobile devices will connect with Long Term Evolution, LTE, towers and various WiFi networks through normal day to day use. Each of these towers and networks have unique identifiers associated with them. In addition there are geographical or Global Positioning System (GPS) coordinates that are associated with each of these towers and networks. By creating various UUIDs for each interaction that are separated by both time and distance, the motion of a user device can be monitored. While knowing the location is part of the invention, it can be anonymized by only monitoring if there is movement between locations, rather than the specific location.

As the system gathers information, the number of UUIDs associated with a user device grows over time. While a new user would have only a few UUIDs, an individual that walked around with their mobile device, signing into it at various times, and typing upon it could create dozens or hundreds of unique touch points over a few days. Once a backlog of UUIDs are created and stored in a database, an electronic service that is receiving a login request from a user could request multiple UUIDs to prove the user's identity, or just that this is a person and not a bot. Various levels of security could be provided by requesting differing numbers of UUIDs, a small number for a low security amount, and a large number for the opposite.

The various types of UUIDs generated would have varying levels of difficulty to mimic by a computer. UUIDs generated by the motion between LTE towers and WiFi networks would be extremely difficult to mimic, whereas faking the input speed of a human entering text into a software keyboard would potentially be easier. It is the variety of UUIDs that helps create a picture of a complete individual. Various levels of security could also be created through requiring only specific types of UUIDs. This can also distinguish between bots that can only fake a limited amount of UUIDs but not the full range of human behavior.

In an effort to prevent software from mimicking the UUID generation, all this data gathering can be accomplished through a hardware chip that monitors the user device and is located on the users' mobile device or other input device. During the creation of a UUID a verification can be conducted that confirms that the chip or the rest of the hardware on the device has not been compromised. This would add an additional layer of security to the creation of the UUIDs.

The peripherals attached to the user device require a way to detect if they have been tampered with. This invention accomplishes this by having a way for the hardware to sign off hashes to go along with the sensors to verify their authenticity. For example, videos posted to a user device will have the ability to show digitally altered versions plus the original if anyone wanted to see.

Sensors for verified devices will have additional requirements than just hashing the output video. In the case of a camera the addition of a small Light Detection and Ranging (LIDAR) sensor could detect if a flat screen was in front as well as a thermal sensor can see if the Infrared (IR) is not matching with the visible spectrums.

In order to detect if an individual is a trusted contact within a mobile device, a Secure Shell (SSH) key pair is transferred amongst all of your devices. This can prove that 1 key pair is assigned to 1 human and that 1 human is the one responsible for various human tasks. Since privacy is a concern there is a need to cryptographically secure the key in a manner in which it can be used to prove 1 human is responsible, but the user cannot identify which human is responsible. You can also use this to verify the contacts in your phone are accurate. For example, if your contacts authenticate with you then they are verified with the SSH. A malicious user cannot call you pretending to be the contact without the contact's phone or other personal device.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 1 illustrates a system for identity verification in accordance with an exemplary embodiment of the invention FIG. 2a illustrates the user device system diagram in accordance with an exemplary embodiment of the invention FIG. 2b illustrates the other device system diagram in accordance with an exemplary embodiment of the invention FIGS. 3a and 3b illustrate the method in accordance with an exemplary embodiment of the invention FIG. 4 illustrates one embodiment of the computing architecture that supports an embodiment of the inventive disclosure.

DETAILED DESCRIPTION OF EMBODIMENTS

Figure 1:
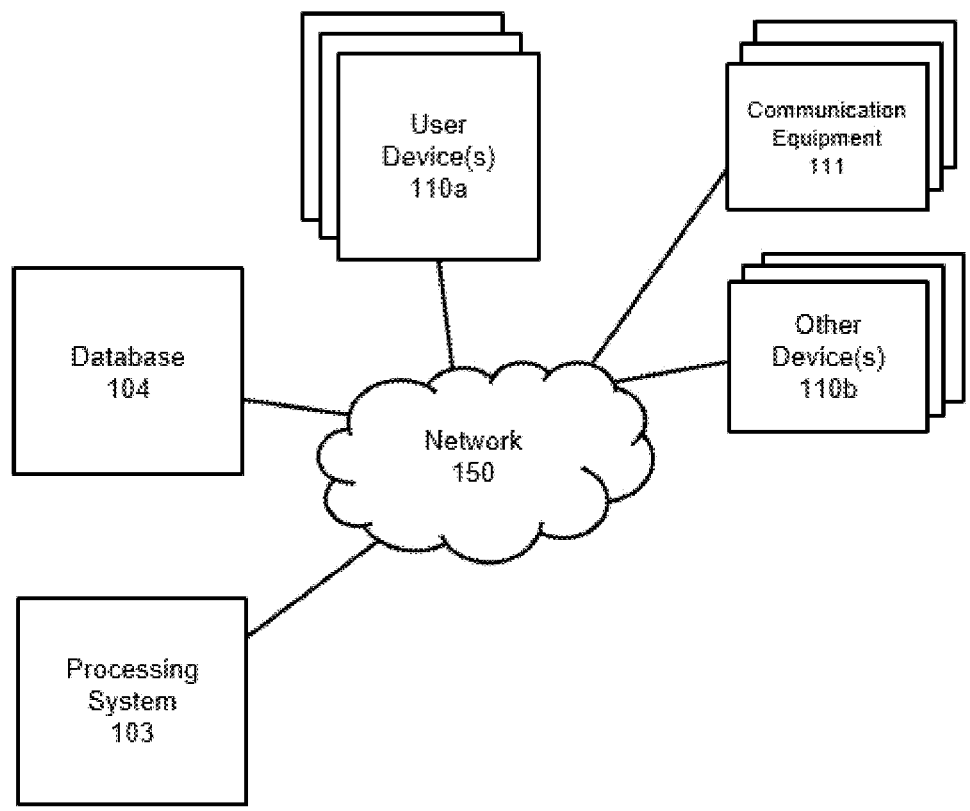

The following invention allows for the creation of UUIDs linked with a specific individual's device and its interaction with the various electronic devices located around it. As a user interacts with their device and that device interacts with the surrounding world, a UUID is created. This UUID is then stored upon a user's device as well as created in an online database. These UUIDs are unique to each interaction and identical copies are found both on the device and that of the database. When a user wishes to access an online service, for example, social media, the user will make a request to that service. The online service may then ask for a list of UUIDs from the user device to verify that they are who they say they are. The online service can then request a matching list of UUIDs from the online database. If these UUIDs match, the user identity is confirmed. However, if the UUIDs are different, the online service can safely assume that the device making a request is doing so maliciously and their request should be denied. Various UUID types will need to be created in order to provide a satisfactory level of confidence in a user's identity. These will need to differentiate human and bot actions.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates a system for bot detection embodying the current invention and the various components that make up the invention. A processing system 103 may be either installed on the user device 110a or separately connected over the electronic network 150. An optional database 104 is connected over the electronic network 150 to connect to the user device 110a and the other devices 110b. One or more user device(s) 110a are optionally able to connect to a database 104 to exchange information over an electronic network 150. These user devices 110a are also able to receive requests from and transmit a response to other devices 110b over the electronic network 150. Communication equipment 111 is able to send information to the user device over the electronic network 150. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention.

In the exemplary embodiment of the processing system 103 is stored on the user device 110a. This processing system can be, for example, but not limited to a chip installed on the user device. The processing system is able to generate identifiers for the user device 110a and store them on at least the user device 110a and the database 104. These identifiers are able to identify human activity and verification of a user based on how they are generated by the processing system 103.

The database 104 is connected remotely to the user device 110a and other devices 110b. The database 104 could be by example but not restricted to a centralized database or a cloud database. This database 104 is capable of storing and organizing multiple device identifiers for multiple users. This database 104 is not used in the exemplary embodiment, but can be used as a way to confirm that the information being presented by the user device 110 is true.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Other devices 110b include computing devices that make identifying requests of user devices 110a. These other devices include, but are not limited to social media platforms and all electronic devices to include cell phones, text messages, voice calling, and other forms of communication. These other devices 110b are capable of communicating with the user devices 110a and the database 104 to request identification and receive a response from both of these sources.

Communication equipment 111 includes by example but not limited to LTE towers and other wireless fidelity, wifi, devices. This communication equipment 111 sends information over their various electronic networks identifying the unique network. This unique network identifier may also have a location associated with it. This location can be compared against other identifier networks to register movement by a user device 110a.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In a particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include additional hardware processors within the user devices 110a. Other databases and systems may be added or subtracted, as would be readily understood by a person of ordinary skill in the art, without departing from the scope of the invention.

Figure 2A:
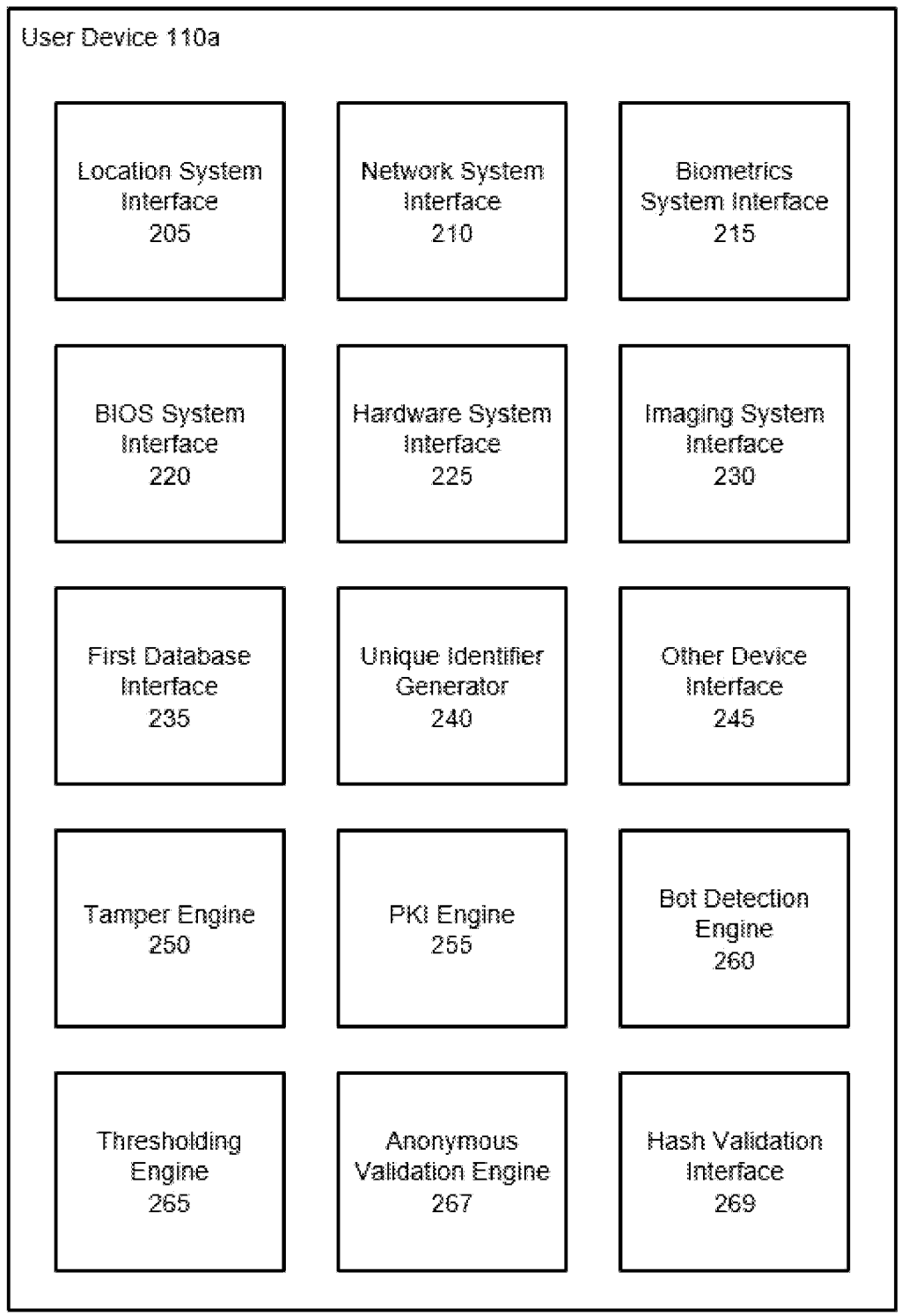

FIG. 2 illustrates an example computing environment in accordance with an exemplary embodiment of the present invention. The computing environment may comprise a group of interfaces that allow the processing system to make observations about human interactions with the user device 110a. These interfaces include a location system interface 205, a network system interface 210, a Biometrics system interface 215, a Basic Input/Output System (BIOS) system interface 220, a Hardware system interface 225, and an imaging system interface 230. The data gathered by these interfaces is sent through a thresholding engine 265 which can be evaluated further with at least the Tamper engine 250, PKI engine 255, Bot detection engine 260 and hash validation interface 269. Once an evaluation is completed, commands are sent to the unique identifier generator 240. In order to communicate with other devices 110b and the database 104, the processing system 103 has a first database interface 235 and an other device interface 245. Lastly, the anonymous validation engine 267 can allow for more efficient use of the user device 110a.

The location system interface 205 allows the processing system 103 to obtain data about the location of the user device 110a. This data can be obtained from Global Positioning System (GPS) data, GLObal NAvigation Satellite System (GLONASS) data, and Galileo data sources. In one embodiment of the invention, the location system interface 205 captures data at two different times, which could include a first time and a second time. The location system interface 205 is able to capture coordinates of the user device at a first time and compare them to coordinates captured at a second time and location. In one instance, the location system interface 205 applies a threshold to the plurality of obtained location data. A variety of different thresholding algorithms may be applied, as would be understood by a person of ordinary skill in the art. The threshold data may be used to determine whether movement approximates that of a human. For example, if the distance data exceeds a threshold, the location system interface 205 may assume that the movement is associated with a human being. When human-like movement is detected, a command is then sent to the unique identifier generator 240 to create a new identifier. Alternatively, the location system interface 205 is connected over two methods. One connection is formed between the interface and the unique identifier generator 240 and the other is connected to the hash validation interface 269. The hash validation interface 269 will help ensure the integrity of the location system interface 205.

The network system interface 210 is used to connect the processing system 103 to the electronic networks surrounding the user device 110a. The network system interface 210 records the identifying information for the various networks to which the user device 110a connects. The information captured is made up for example but not limited to a LTE tower or wifi network data sets. These data sets can include both names of the networks and locations. As a user connects and reconnects to the various networks a threshold will be applied to see if the various connections represent human-like behavior. If the changes in networking are determined to be human-like, a command is sent to the unique identifier generator 240 to create a new identifier. Alternatively, the network system interface 210 is connected over two methods. One connection is formed between the interface and the unique identifier generator 240 and the other is connected to the hash validation interface 269. The hash validation interface 269 will help ensure the integrity of the network system interface 210.

Biometrics system interface 215 allows the processing system 103 to obtain data about the user of the user device 110a. This data can be obtained from fingerprint images, iris images, thermometers, seismographs, microphones, accelerometers, gyroscopes and facial image sources. The biometrics system interface 215 is able to capture unique physical characteristics of the user of the user device 110a. The various data sets captured by the biometric sensor can be compared to previously captured data sets to see if they match. By applying a threshold to the data sets the user interactions over time can be judged as being that of human-like and of an unchanging user or that of imitated or inconsistent user interactions. When human-like movement is detected, a command is then sent to the unique identifier generator 240 to create a new identifier. Alternatively, the biometrics system interface 215 is connected over two methods. One connection is formed between the interface and the unique identifier generator 240 and the other is connected to the hash validation interface 269. The hash validation interface 269 will help ensure the integrity of the location system interface 205.

Basic Input/Output System (BIOS) system interface 220 allows the processing system 103 to obtain data about the firmware of the user device 110a. This data can be obtained through monitoring of the BIOS of the user device 110a. The BIOS system interface 220 is able to capture the device status of the user device 110a. The various data sets captured by the BIOS sensor can be compared to previously captured data sets to see if they match. By applying a threshold to the data sets the BIOS status over time can be judged as being that of an uncompromised device, a command is then sent to the unique identifier generator 240 to create a new identifier. Also, if the BIOS is found to be corrupted, a negative identifier command can be sent to the unique identifier generator 240. Alternatively, the BIOS system interface 220 is connected over two methods. One connection is formed between the interface and the unique identifier generator 240 and the other is connected to the hash validation interface 269. The hash validation interface 269 will help ensure the integrity of the BIOS system interface 220.

Hardware system interface 225 allows the processing system 103 to obtain data about the user device 110a. This data can be obtained from connections to various hardware in the user device 110a. The hardware system interface 225 is able to capture unique hardware statuses of the user device 110a. The various data sets captured by at least one hardware sensor can be compared to previously captured data sets to see if they match. By applying a threshold to the data sets the hardware status over time can be judged as being that of an uncompromised or compromised device. When an uncorrupted device is detected, a command is then sent to the unique identifier generator 240 to create a new identifier. Also, if the hardware is found to be corrupted, a negative identifier command can be sent to the unique identifier generator 240. Alternatively, the biometrics system interface 215 is connected over two methods. One connection is formed between the interface and the unique identifier generator 240 and the other is connected to the hash validation interface 269. The hash validation interface 269 will help ensure the integrity of the location system interface 205.

Imaging system interface 230 allows the processing system 103 to obtain data about the surroundings of the user device 110a. This data can be obtained from camera sources. The imaging system interface 230 is able to capture unique images from a camera in the vicinity of the user device 110a. The various data sets captured by the camera can be compared to previously captured data sets to see if they match. In addition the imaging system interface 230 has methods to ensure that the images are from actual physical surroundings instead of a screen being placed in front of the camera. Such methods include, but are not limited to, a LIDAR or infrared camera. By applying a threshold to the data sets the user interactions over time can be judged as being that of human-like and of an unchanging user or that of imitated or inconsistent user interactions. When human-like actions are detected, a command is then sent to the unique identifier generator 240 to create a new identifier. Alternatively, the imaging system interface 230 is connected over two methods. One connection is formed between the interface and the unique identifier generator 240 and the other is connected to the hash validation interface 269. The hash validation interface 269 will help ensure the integrity of the imaging system interface 230.

First Database interface 235 is used to connect the processor to a cloud or remote database. This database can be used to store copies of the UUIDs generated by the unique identifier generator 240. The processor is able to optionally store a copy of the UUIDs in order to use as an additional level of verification when another device 110b requests user identity and verification.

Unique identifier generator 240 is used to create an identifier when it receives a command from at least one of the sensor interfaces 205, 210, 215, 220, 225, 230. This identifier in this embodiment of the invention is a UUID, a 128-bit value used to uniquely identify an object or entity on the internet. Over time, the unique identifier generator will create a large number of UUIDs and consolidate them into a single list associated with a user and user device 110a. In addition, these UUIDs may be associated with a specific user, across multiple user devices 110a in the user's possession. Alternatives to the UUID include, but are not limited to, Universally Unique Lexicographically Sortable Identifier (ULID) and NanoIDs.

Other device interface 245 is used to receive requests and send verification information from the processing system 103 in the user device 110a to the other device 110b. Once a request is received from the other device comprising a number and type of identifier, the other device interface 245 works in conjunction with the unique identifier generator 240, to verify that the request is met, and provide a positive, negative, or inconclusive response to the other device 110b. Alternatively, SSH key pairs can be used to verify the user device 110a and other device 110b.

Tamper engine 250 is used to verify that the information generated by the processing system 103 has not been imitated or corrupted. The tamper engine is able to determine for each of the sensor interfaces 205, 210, 215, 220, 225, 230 have been tampered with by outside users. If tampering is detected, the tamper engine will work in conjunction with the bot detection engine 260 and blacklist the processing system 103 and user device 110a and prevent them from being used to validate or identify a user.

The Public key infrastructure, PKI, engine 255 is used to manage, distribute, use, store and revoke digital certificates and manage public-key encryption. In order to maintain user anonymity, the PKI engine 255 is able to encrypt and decrypt the information from sensor interfaces 205, 210, 215, 220, 225, 230 and the information generated by the unique identifier generator 240.

Bot detection engine 260 is used to verify that the number and types of UUIDs generated by the processing system 103 are produced by a human. By comparing the information with a thresholding engine 265 to expected human-like behavior, bots or unscrupulous actors can be detected. When bots are detected, the user device 110a and processing system 103 are blacklisted and prevented from being used to validate or identify a user Thresholding engine 265 is used to determine the status of the information coming from at least one of the sensor interfaces 205, 210, 215, 220, 225, 230. This is done by setting various levels of activity to reflect human-like behavior or alternatively reflect bot-like behavior. Once the information exceeds a threshold, a command can be issued to the unique identifier generator 240 or the bot detection engine 260. The thresholding engine 265 uses at least one of a global threshold model, a liability threshold model, or a segmented regression analysis in order to determine an appropriate threshold to set for various activities.

The anonymous validation engine 267 allows anonymous user logins where a user can use a website completely anonymously while also being verified as a human. The validation will happen on the user device 110a automatically for a specific other device 110b. If a user chooses they can make a user account with only a username required for login. Alternatively, a user device 110a can automatically login to an other device 110b using the user device 110a both anonymously and as a known entity and a case in which the processing system 103 can validate and verify without sending any UUID's.

Hash validation interface 269 verifies that the sensors accessed by the sensor interfaces 205, 210, 215, 220, 225, 230 have not been edited digitally. The sensor will send its data to the user device 110a and have a separate pipe to the processing system 103. The data from the sensor will be hashed with the time, and chip number on the user device 110a itself and the processing system 103. The user device 110a will then send the hash to the processing system 103 and the processing system 103 will verify the accuracy of the hash. If it is not verified the processing system 103 will indicate the sensor as being inauthentic.

Figure 2B:
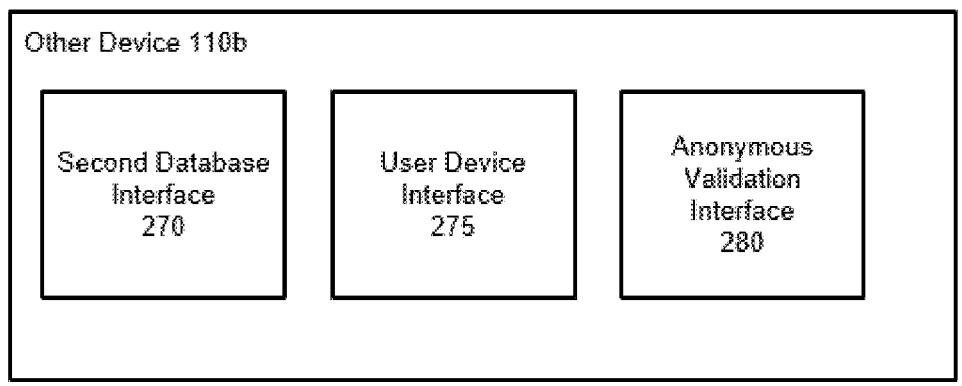

FIG. 2b illustrates an example computing environment in accordance with an exemplary embodiment of the present invention. The computing environment may comprise a set of interfaces to communicate with the user device including but not limited to a user device interface 275 and an anonymous validation interface 280. There is optionally an interface 270 to connect to the remote database 104.

The second database interface 270 is used to allow the other user device 110b to optionally access the remote database 104. This interface will allow the other user to verify validation information from both the user device 110a and the database 104. This two level verification improves confidence in the verification of the user. The second database interface 270 is able to confirm that the information matches from both sources, and if it does not, the user verification is rejected.

User device interface 275 is used to receive requests and send verification information from the processing system 103 in the user device 110a to the other device 110b. Once a request is received from the other device 110b comprising a number and type of identifier, the other device interface 245 works in conjunction with the unique identifier generator 240, to verify that the request is met, and provide a positive, negative, or inconclusive response to the other device 110b. Alternatively, SSH key pairs can be used to verify the user device 110a and other device 110b. Alternatively a verified user may have multiple user devices 110a and this interface allows for easier validation of a user by keeping track of the various devices 110a that the user uses to access the other device 110b. This can be done automatically without asking for a user id and password system by just verifying the processing system 103 in the user device 110a has already been verified and is trusted.

Anonymous validation interface 280 allows anonymous user logins where a user can use a website completely anonymously while also being verified as a human. The validation will happen on the user device 110a automatically for a specific other device 110b. If a user chooses they can make a user account with only a username required for login. Alternatively, a user device 110a can automatically login to an other device 110b using the user device 110a both anonymously and as a known entity and a case in which the processing system 103 can validate and verify without sending any UUID's.

Figure 3A:
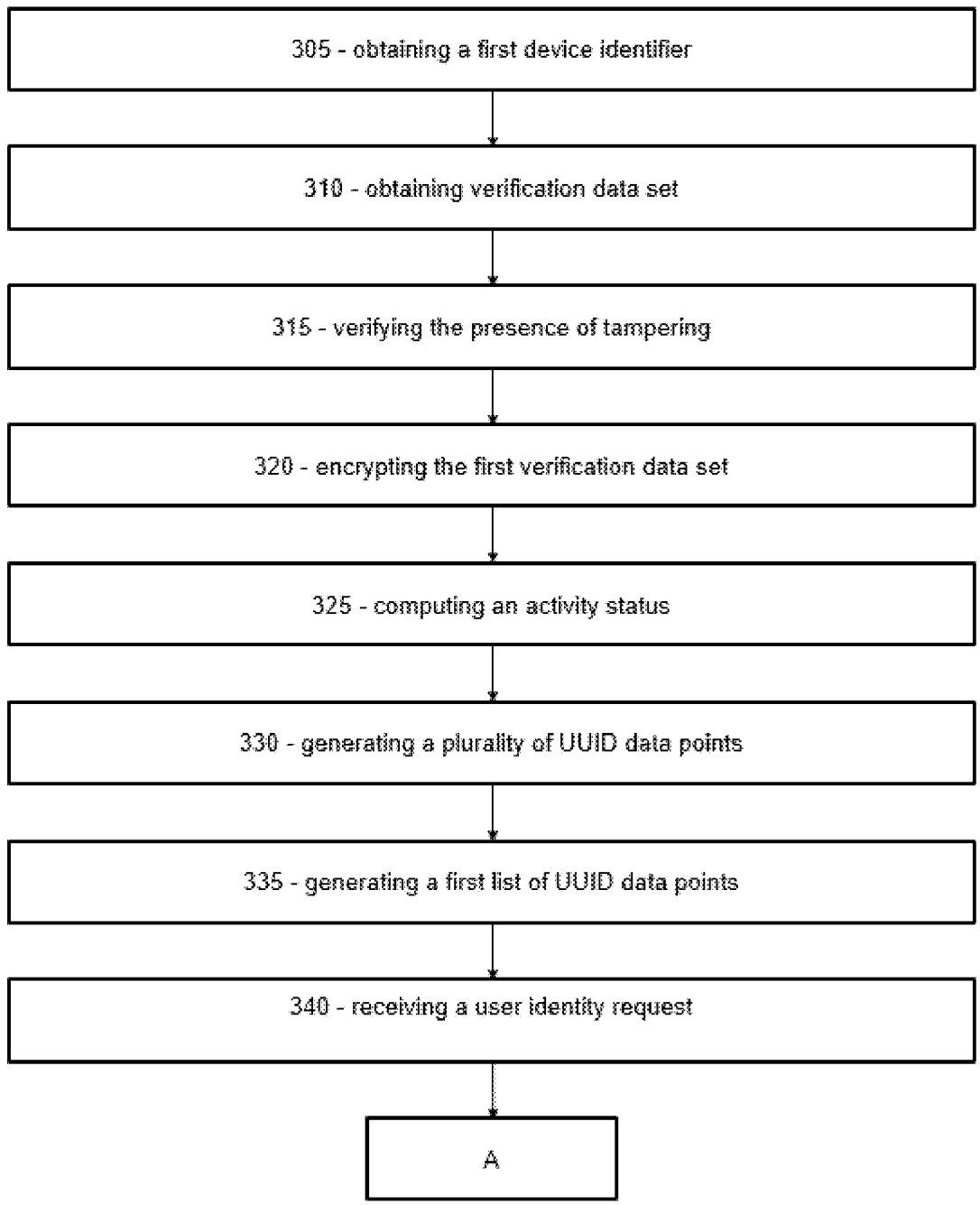
Figure 3B:
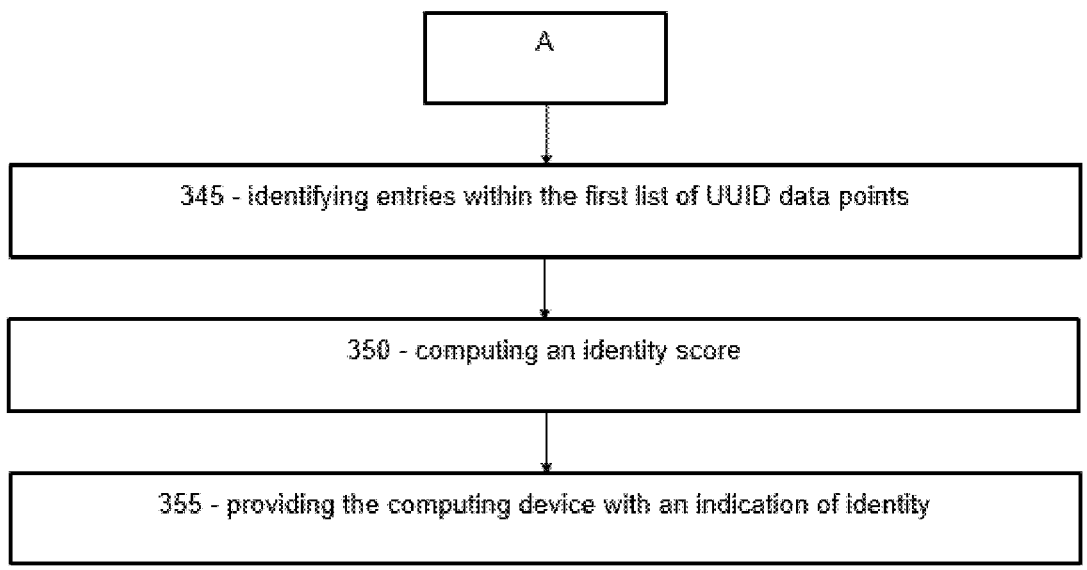

FIGS. 3*a* and *b* illustrate an exemplary process for identity verification of trusted users on social media platforms and all electronic devices. It comprises the steps: obtaining a first device identifier 305, obtaining a verification data set 310, verifying the presence of tampering 315, encrypting the first verification data set 320, computing an activity status 325, generating a plurality of UUID data points 330, generating a first list of UUID data points 335, receiving a user identity request 340, identifying entries within the first list of UUID data points 345, computing an identity score 350, and providing the computing device with an indication of identity 355.

At step 305, a device identifier is obtained. The device identifier is associated with a user device and a user. In one embodiment, the device identifier is accessed via BIOS access calls. In other embodiments, the device identifier is obtained via API permissions calls. The first step of obtaining a first device identifier 305 comprises the processing system 103 providing an identification for user device 110*a*. This identification is associated with the device and alternatively also the user of the device.

Obtaining a verification data set 310 comprises receiving at least one set of data from at least one of the sensor interfaces 205, 210, 215, 220, 225, 230. This data set could be a single point of information or made up of multiple points of data from multiple sources.

Verifying the presence of tampering 315 is done to ensure that the data obtained from at least one of the sensor interfaces 205, 210, 215, 220, 225, 230 has not been faked by an unscrupulous user. This is done by the tamper engine 250. If tampering is detected, the processing system 103 and user device 110*a* are blacklisted and unable to provide further verification.

Encrypting the first verification data set 320 is done to mask the user and prevent other devices 110*b* and other users from gaining personal information on the user based on, but not limited to, movement information, images, and biometric information. This is accomplished by the PKI engine 255.

Computing an activity status 325 is accomplished by the thresholding engine 265 and the bot detection engine 260. The information from sensor interfaces 205, 210, 215, 220, 225, 230 is compared to a threshold which indicates human-like behavior. For example, the typing speed on a keyboard, movement between different LTE towers, or a picture of a user's face, could indicate that the user is a human and not a bot. Alternatively, the lack of movement, machine-like typing speeds, or imitated images would indicate that the user is actually a bot.

Generating a plurality of UUID data points 330 is done once the thresholding engine 265 and the bot detection engine 260 have analyzed the information. This UUID is stored on the user device 110 and alternatively a copy is stored on the database 104.

Generating a first list of UUID data points 335 is accomplished by combining the plurality of UUID data points into a list associated with the user and user device 110*a*. This list is used for verification requests from other user devices 110*b*.

Next the processing system receives a user identity request 340 from other user devices 110*b*. This could be from a social media site, other mobile devices or computing systems. This identity request comprises at least one of a number, a threshold and type of UUID data points within the first list of UUID data points.

Identifying entries within the first list of UUID data points 345 and comparing them to the request received from the other user device 110*b*. The number, threshold and type of UUID data points is compared to see if the request can be met by the list of UUID data points.

Computing an identity score 350 is done after the comparison is made. Based on the success or failure to meet the request, a user identity is either verified or unverified. Additionally if any tampering or blacklisting of the user device 110*a* is detected, the identity score will be determined as unverified.

Providing the computing device with an indication of identity 355 is accomplished by the user device 110*a* sending a message that the user is either verified or unverified in a secure way. In the current embodiment the user device 110*a* can send the indication directly to the other device 110*b* and the other device 110*b* can check if the user device 110*a* is whitelisted. Alternatively, the user device 110*a* can send to a 3rd party that does the authentication then the 3rd party can send the indication to the other device 110*b*.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above mentioned systems, units, modules, engines, controllers, interfaces, components or the like may be and/or comprise hardware and/or software as described herein. For example, the enterprise system 101, the query wise stateless structure engine 110, the large language model (LLM) system 120, the network 150, and subcomponents thereof may be and/or comprise computing hardware and/or software as described herein in association with FIGS. 4-7. Furthermore, any of the above mentioned systems, units, modules, engines, controllers, interfaces, components or the like may use and/or comprise an application programming interface (API) for communicating with other systems units, modules, engines, controllers, interfaces, components, or the like for obtaining and/or providing data or information.

Figure 4:
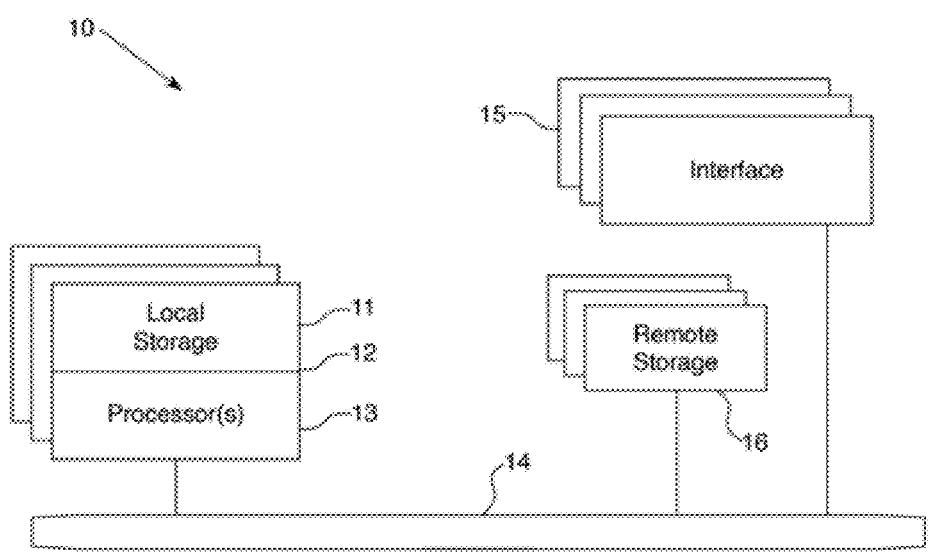

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, Universal Serial Bus (USB), Serial, Ethernet, FIREWIRE™, THUNDERBOLT™, PCI, parallel, Radio Frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, High-Definition Multimedia Interface (HDMI), Digital Visual Interface (DVI), analog or digital audio interfaces, Asynchronous Transfer Mode (ATM) interfaces, High-Speed Serial Interface (HSSI) interfaces, Point of Sale (POS) interfaces, Fiber Data Distributed Interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as Compact Disc Read-Only Memory (CD-ROM) disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
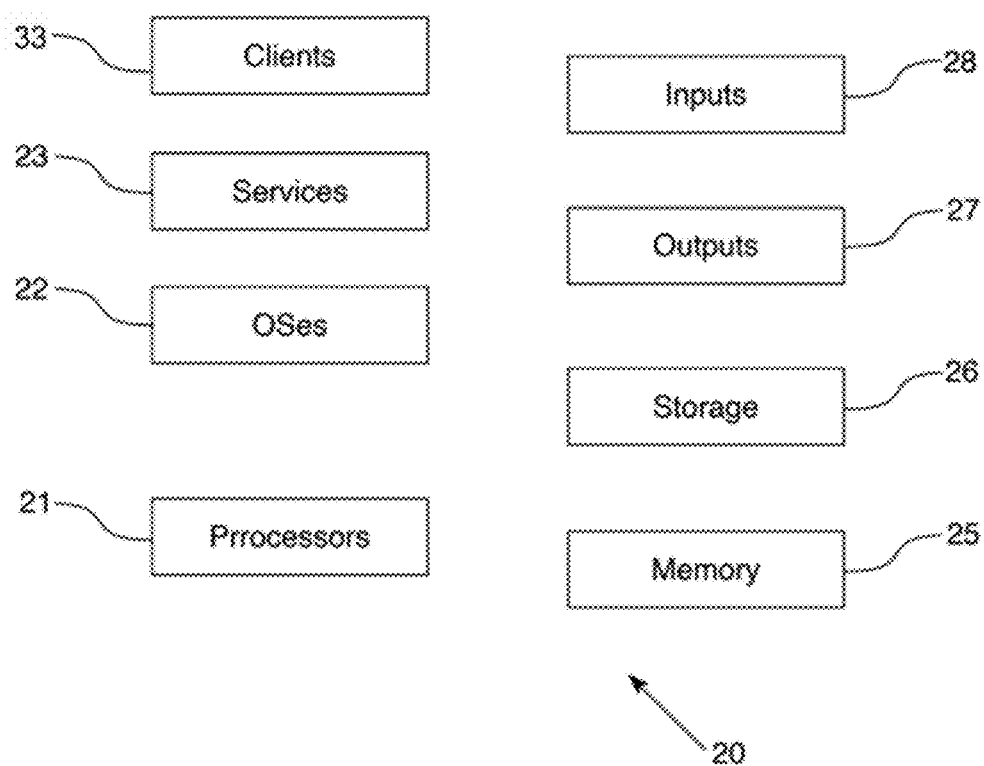
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
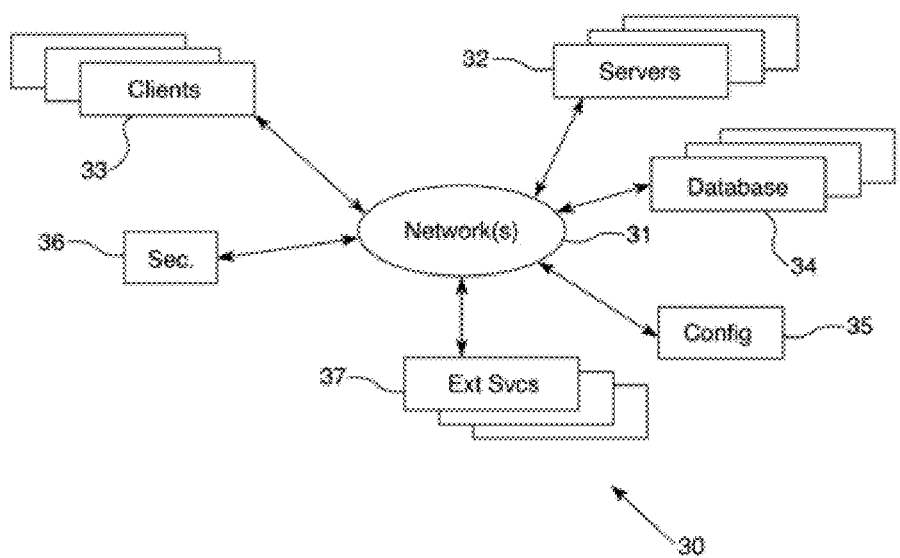
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as Code Division Multiple Access (CDMA) or Global System for Mobile Communications (GSM) cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35.

Security and configuration management are common Information Technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
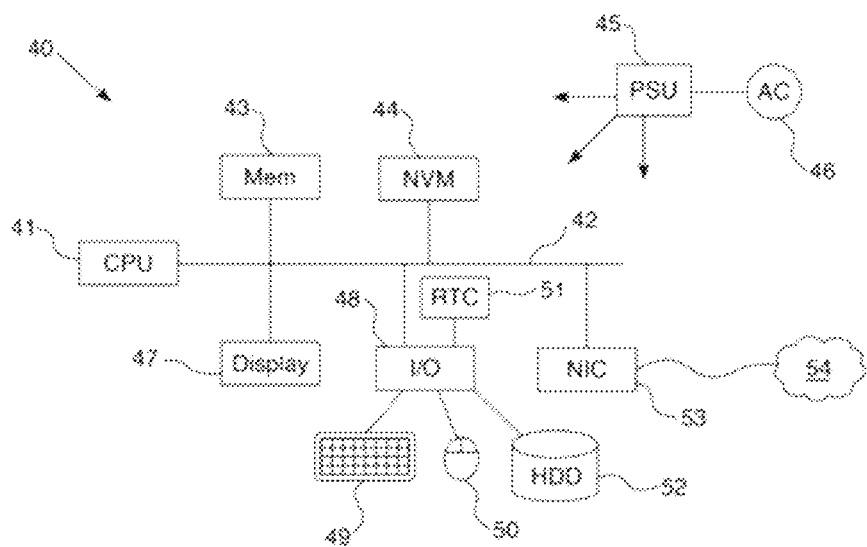
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for bot detection and user identity verification, the computer implemented method comprising:

obtaining a first device identifier associated with a first user;

obtaining at a plurality of times, at least one of a plurality of biometric data sets, a plurality of usage data sets, a plurality of network communication data sets, a plurality of image data sets from an image capture device associated with the first device identifier, a plurality of location data sets associated with the first device identifier, and a plurality of Secure Shell (SSH) key pairs to make a plurality of verification data sets;

verifying the presence of tampering on a device associated with the first device identifier;

encrypting the plurality of verification data sets;

computing a plurality of activity status based on predictive analytics, the computation performed based on the verification data sets and activity thresholds;

generating a plurality of Universally Unique Identifier (UUID) data points;

generating a first list of UUID data points from the plurality of UUID data points associated with the device identifier;

receiving a user identity request from a computing device, wherein the user identity request specifying requirements of at least one of a number, a threshold and type of UUID data points within the first list of UUID data points;

identifying entries within the first list of UUID data points that match the received user identity request;

computing an identity score based on the identified entries, the computation comprising determining whether the score meets a threshold provided in the user identity request; and providing the computing device with an indication of whether a first user device meets the requirements set forth in the received identity request.

2. The computer implemented method according to claim 1, further comprising a first database that is connected to the first user device and a second user device over an electronic network.

3. The computer implemented method according to claim 2, further comprising copying the plurality of UUID data points from the first user device.

4. The computer implemented method according to claim 1, wherein the biometric data sets comprise at least one of fingerprint images, iris images and facial images.

5. The computer implemented method according to claim 1, wherein the usage data sets comprise at least one of movement from an accelerometer, and a keyboard input analysis.

6. The computer implemented method according to claim 1, wherein the network communication data sets comprise at least one of a LTE tower or wifi network data sets.

7. The computer implemented method according to claim 1, wherein the image data sets comprise images gathered from a camera associated with the first device identifier.

8. The computer implemented method according to claim 1, wherein the location data sets comprise at least one of Global Positioning System (GPS) data, GLObal NAvigation Satellite System (GLONASS) data, and Galileo data.

9. The computer implemented method according to claim 1, wherein the first user device and a second user device are connected over an electronic network.

10. The computer implemented method according to claim 1, wherein verifying the presence of tampering on a device comprises verifying that at least one of the biometric data sets, the usage data sets, the network communication data sets, the image data sets, and the location data sets have not been edited digitally.

11. The computer implemented method according to claim 1, further comprising masking the identity of the first user when providing the computing device with an indication of whether the first user device meets the requirements set forth in the received identity request.

12. The computer implemented method according to claim 1, further comprising generating an approval message from the first user device and providing the approval message to the computing device to allow access to the computing device.

13. A computing system for bot detection and user identity verification, the computing system comprising:
   at least one computing processor; and
   memory comprising instructions that, when executed by the at least one computing processor, enable the computing system to:
   obtaining a first device identifier associated with a first user;
   obtaining at a plurality of times, at least one of a plurality of biometric data sets, a plurality of usage data sets, a plurality of network communication data sets, a plurality of image data sets from an image capture device associated with the first device identifier, a plurality of location data sets associated with the first device identifier, and a plurality of Secure Shell (SSH) key pairs to make a plurality of verification data sets;
   verifying the presence of tampering on a device associated with the first device identifier;
   encrypting the plurality of verification data sets;
   computing a plurality of activity status based on predictive analytics, the computation performed based on the verification data sets and activity thresholds;
   generating a plurality of Universally Unique Identifier (UUID) data points;
   generating a first list of UUID data points from the plurality of UUID data points associated with the device identifier;
   receiving a user identity request from a computing device, wherein the user identity request specifying requirements of at least one of a number, a threshold and type of UUID data points within the first list of UUID data points;
   identifying entries within the first list of UUID data points that match the received user identity request;
   computing an identity score based on the identified entries, the computation comprising determining whether the score meets a threshold provided in the user identity request; and
   providing the computing device with an indication of whether a first user device meets the requirements set forth in the received identity request.

14. A non-transitory computer readable-medium comprising instructions that when executed by a processor enable the processor to:
   obtaining a first device identifier associated with a first user;
   obtaining at a plurality of times, at least one of a plurality of biometric data sets, a plurality of usage data sets, a plurality of network communication data sets, a plurality of image data sets from an image capture device associated with the first device identifier, a plurality of location data sets associated with the first device identifier, and a plurality of Secure Shell (SSH) key pairs to make a plurality of verification data sets;
   verifying the presence of tampering on a device associated with the first device identifier;
   encrypting the plurality of verification data sets;
   computing a plurality of activity status based on predictive analytics, the computation performed based on the verification data sets and activity thresholds;
   generating a plurality of Universally Unique Identifier (UUID) data points;
   generating a first list of UUID data points from the plurality of UUID data points associated with the device identifier;
   receiving a user identity request from a computing device, wherein the user identity request specifying requirements of at least one of a number, a threshold and type of UUID data points within the first list of UUID data points;
   identifying entries within the first list of UUID data points that match the received user identity request;
   computing an identity score based on the identified entries, the computation comprising determining whether the score meets a threshold provided in the user identity request; and
   providing the computing device with an indication of whether a first user device meets the requirements set forth in the received identity request.

* * * * *